(12) United States Patent
Takabatake et al.

(10) Patent No.: US 7,893,991 B2
(45) Date of Patent: Feb. 22, 2011

(54) IMAGE READING APPARATUS

(75) Inventors: Masanari Takabatake, Ishikawa (JP);
Satoshi Miyamoto, Ishikawa (JP)

(73) Assignee: PFU Limited, Ishikawa (JP)

( * ) Notice: Subject to any disclaimer, the term of this patent is extended or adjusted under 35 U.S.C. 154(b) by 374 days.

(21) Appl. No.: 12/187,161

(22) Filed: Aug. 6, 2008

(65) Prior Publication Data

US 2009/0153674 A1  Jun. 18, 2009

(30) Foreign Application Priority Data

Dec. 18, 2007  (JP) .............................. 2007-325502

(51) Int. Cl.
H04N 5/225 (2006.01)
H04N 5/228 (2006.01)
H04N 1/04 (2006.01)
G02B 17/00 (2006.01)
G02B 26/08 (2006.01)
G06K 9/36 (2006.01)
G03B 27/52 (2006.01)

(52) U.S. Cl. .................... 348/373; 348/376; 348/222.1; 358/474; 358/486; 382/289; 382/291; 359/202.1; 359/599; 355/25

(58) Field of Classification Search ................. 348/373, 348/376, 222.1; 359/599, 707, 201.1, 202.1, 359/196.1; 382/289, 290, 291; 356/446, 356/445; 355/21, 25, 67, 75; 396/200, 273; 358/474, 486, 487, 488, 497
See application file for complete search history.

(56) References Cited

U.S. PATENT DOCUMENTS

| 4,939,580 | A  | * | 7/1990 | Ishikawa et al. ............. 348/373 |
| 5,929,910 | A  | * | 7/1999 | Kim et al. .................... 348/373 |
| 6,339,447 | B1 | * | 1/2002 | Kurahashi et al. ............. 348/96 |
| 6,996,258 | B2 | * | 2/2006 | Nakamura et al. ........... 382/124 |
| 7,050,106 | B2 | * | 5/2006 | Nagano ...................... 348/373 |
| 7,212,279 | B1 | * | 5/2007 | Feng ........................... 356/71 |
| 2009/0262200 | A1 | * | 10/2009 | Takabatake et al. ....... 348/207.1 |

FOREIGN PATENT DOCUMENTS

| JP | 62-138890 A | 6/1987 |
| JP | 04-025748 B2 | 1/1992 |
| JP | 2005-184361 A | 7/2005 |

* cited by examiner

*Primary Examiner*—Lin Ye
*Assistant Examiner*—Marly Camargo
(74) *Attorney, Agent, or Firm*—Lowe Hauptman Ham & Berner LLP

(57) ABSTRACT

An original is inclined with respect to an optical axis of a camera until the camera is positioned outside a reflected-image taking range by inclining a mounting surface of an original glass on which the original is placed. This makes it possible, when the original is taken by the camera, to prevent the camera from being reflected on the original and being taken in with the original. An imaging case formed of a diffusing member that is made of a high light-diffusing material or a high light-absorbing material is arranged in the reflected-image taking range. This makes it possible to prevent an object positioned in the reflected-image taking range from being reflected on the original and being taken by the camera. Consequently, clear image information can be more reliably obtained.

4 Claims, 8 Drawing Sheets

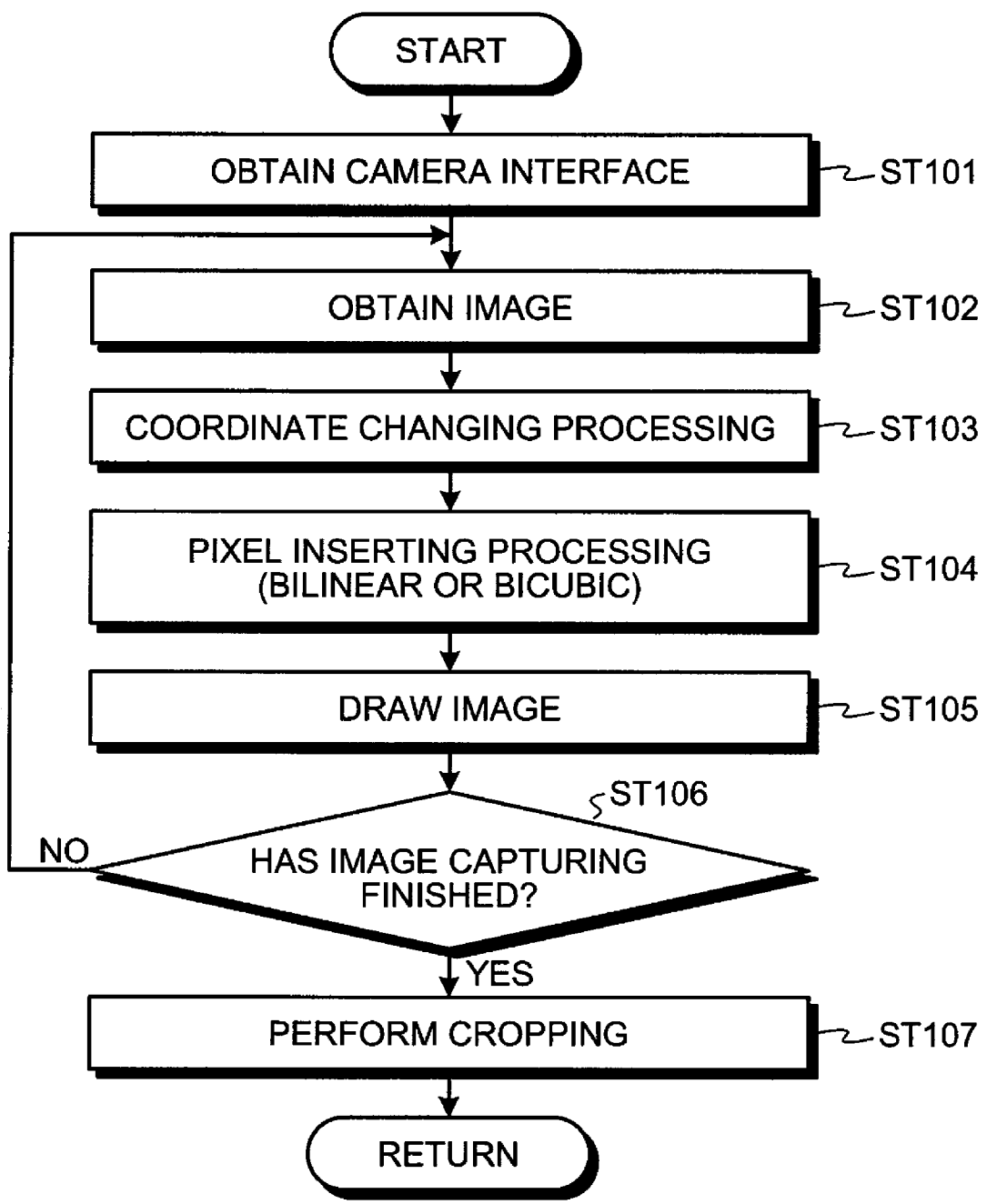

IMAGE READING APPARATUS

RELATED APPLICATIONS

The present application is based on, and claims priority from, Japan Application Number 2007-325502, filed Dec. 18, 2007, the disclosure of which is hereby incorporated by reference herein in its entirety.

BACKGROUND OF THE INVENTION

1. Field of the Invention

The present invention relates to an image reading apparatus, and particularly to an image reading apparatus in which an object placed on a mounting unit is imaged or photographed by an imaging unit.

2. Description of the Related Art

Image information of an object is obtained by imaging or photographing the object by an imaging unit such as a camera in a conventional image reading apparatus. However, when the object includes a shiny portion or material that is easily subjected to specular reflection of light, the specularly reflected light may be directed to a camera. In this case, the camera may capture or image the specularly reflected light. It is sometimes difficult to obtain clear image information of the object because the specularly reflected light appears overexposed. Therefore, specularly reflected light is prevented from being directed to a camera in some conventional image reading apparatuses.

Japanese Patent No. 2921922 discloses, for example, a tablet testing device in which a first polarizing filter is arranged between a lighting device as a lighting unit and a tablet as an object, and a second polarizing filter is arranged between a camera as an imaging unit and the tablet. Thus, light polarized to have a predetermined polarizing angle by the first polarizing filter can be emitted to the tablet and light specularly reflected by a wrapping material of the tablet is shielded by the second polarizing filter. Therefore, it is possible to prevent specularly reflected light from being imaged by the camera. Consequently, clear image information can be obtained.

However, when an object is easily subjected to specular reflection of light, light from a light source of a lighting device may be specularly reflected on the object. In addition, an imaging unit that images the subject or a supporting member associated with the imaging unit may be reflected on the object and imaged by the imaging unit. In other words, when the object is imaged by the imaging unit, the imaging unit or the supporting member may be taken in with the object. Thus, when the imaging unit may be taken in an image taken by the imaging unit, the image taken by the imaging unit easily becomes unclear. Therefore, it is very difficult to obtain clear image information irrespective of an object material.

SUMMARY OF THE INVENTION

It is an object of the present invention to at least partially solve the problems in the conventional technology.

According to an aspect of the present invention, an image reading apparatus includes an imaging unit that images an object; a mounting unit on which, when the imaging unit is capable of imaging the object and the object is imaged by the imaging unit, the object is inclined with respect to an optical axis of the imaging unit at least until the imaging unit is positioned outside a reflected-image taking range in which an image of the imaging unit that is reflected on the object is taken in, and placed; and a diffusing member that is made of one of a high light-diffusing material and a high light-absorbing material and that is arranged in the reflected-image taking range.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart of a processing procedure performed by the image reading apparatus according to the embodiment;

DETAILED DESCRIPTION OF THE PREFERRED EMBODIMENTS

Exemplary embodiments of the present invention are explained in detail below with reference to the accompanying drawings. The present invention is not limited by the embodiments. Some components included in the following embodiments can be easily substituted by those skilled in the art or are substantially the same.

Figure 1:
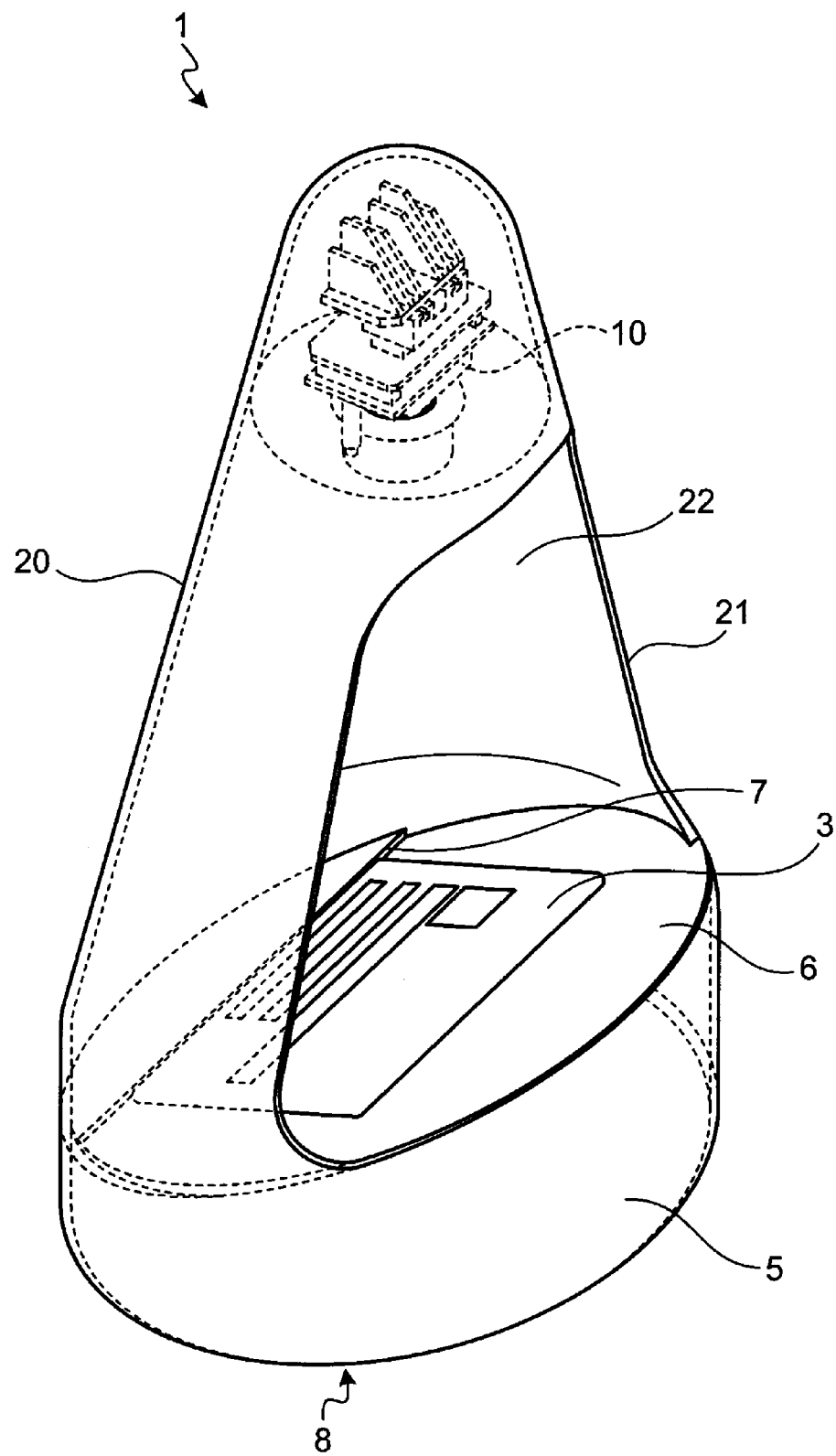
FIG. 1 is a perspective view of an image reading apparatus according to an embodiment of the present invention.

FIG. 1 is a perspective view of an image reading apparatus according to an embodiment of the present invention. The image reading apparatus includes an original glass or platen 5 that is a mounting unit on which an original 3 such as various cards can be placed as an object. The original glass 5 includes a mounting surface 6 on which the original 3 is placed. The mounting surface 6 is positioned opposite to an original glass bottom 8 that is a bottom of the original glass 5. The mounting surface 6 is not formed in parallel with the original glass bottom 8 and is inclined with respect to the original glass bottom 8.

A step portion 7 is arranged on a lower half of the inclined mounting surface 6, that is, part of the mounting surface 6 that approaches to the original glass bottom 8, when the original glass bottom 8 of the original glass 5 is positioned below. The step portion 7 is formed substantially in parallel with a rotation shaft (not shown) used or formed when the mounting surface 6 is inclined with respect to the original glass bottom 8. The inclination is low on part of the inclined mounting surface 6 that approaches to the original glass bottom 8. The inclination is high on part of the inclined mounting surface 6 that is away from the original glass bottom 8. In that case, a surface of the step portion 7 that is formed at a border between the low inclination and the high inclination is arranged to face toward the high inclination because the surface of the step portion 7 on a side of the high inclination is formed lower than the surface on a side of the low inclination. In addition, the step portion 7 is formed substantially in parallel with the original glass bottom 8 because the step portion 7 is formed substantially in parallel with the rotation shaft used when the mounting surface 6 is inclined toward the original glass bottom 8.

A camera 10 by which the original 3 can be imaged is arranged as an imaging unit on a side of the mounting surface 6 of the original glass 5 in such a manner that an optical axis 15 (see FIG. 3) is directed perpendicularly to the original glass bottom 8. Therefore, the camera 10 is arranged for its optical axis 15 to be inclined with respect to the mounting surface 6 of the original glass 5. In other words, the mounting surface 6 is inclined with respect to the optical axis 15 of the camera 10. Specifically, when a surface of an original 3 has gloss and light from outside is thereby reflected on the glossy surface, the mounting surface 6 is inclined for an image of the camera 10 reflected on the original 3 not to be taken in when the original 3 is taken by the camera 10.

The original glass 5 and the camera 10 arranged as described above are connected via an imaging case 20. Specifically, the imaging case 20 is formed along a predetermined part that extends from the low inclination to the high inclination of the mounting surface 6 in an outer periphery of the mounting surface 6 that the original glass 5 has. Therefore, the imaging case 20 is not formed at a predetermined range on the side of the high inclination of the mounting surface 6. The predetermined range on the side of the high inclination of the mounting surface 6 is opened outside. The predetermined range in which the mounting surface 6 is opened outside is taken as an opened portion 21 through which the original 3 can be placed on the mounting surface 6 and removed from the mounting surface 6. In addition, the imaging case 20 is made of a translucent member.

The imaging case 20 connected to the mounting surface 6 of the original glass 5 is formed to extend from the original glass 5 on a side of the mounting surface 6. The camera 10 is fixed to one end of the imaging case 20 that is opposite to the other end of the imaging case 20 that is connected to the original glass 5. Thus, the camera 10 is arranged to have a predetermined distance and angle with respect to the mounting surface 6.

Figure 2:
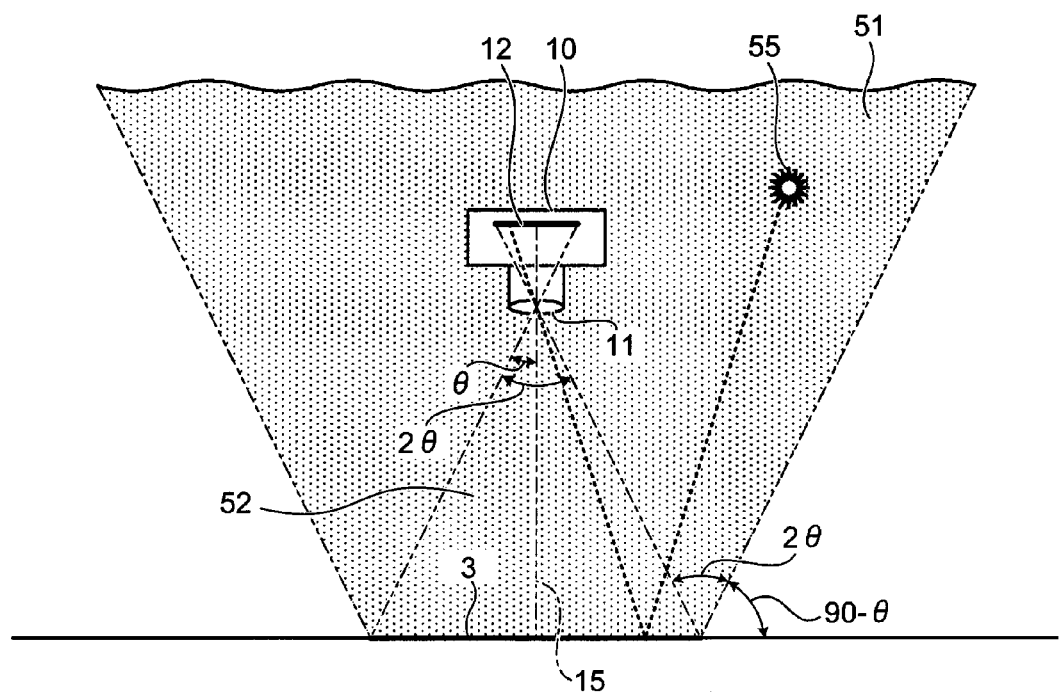
FIG. 2 is a schematic diagram for explaining a relation between a conventional camera and a reflected-image taking range.

The camera 10 that is inclined with respect to the mounting surface 6 is connected to the original glass 5 via the imaging case 20. An angle of inclination of the mounting surface 6 is explained. FIG. 2 is a schematic diagram for explaining a relation between a conventional camera and a reflected-image taking range. When the original 3 is typically taken by the camera 10, the camera 10 and the original 3 are arranged to take an image in such a manner that the optical axis 15 of the camera 10 is perpendicular to the original 3. In that case, for example, when the original 3 is imaged from just above, a surface of the original 3 may have gloss. A predetermined range of the original 3 that faces the camera 10 is defined as a reflected-image taking range 51 in which an image of a light source 55 or an object (not shown) reflected on the original 3, when an image is taken, is taken by the camera 10.

The reflected-image taking range 51 is expanded outside from an image-taking range 52 at the same angle as an image-taking angle 2θ. The image-taking angle 2θ is an angle at which the image-taking range 52 in which an image can be taken, when the original 3 is imaged by the camera 10, is viewed from the camera 10. In other words, when the original 3 is taken by the camera 10, light reflected on the original 3 is passed through a lens 11 of the camera 10 and is entered inside the camera 10. The light reaches an image pickup device 12 such as a charge coupled device (CCD) that the camera 10 has. The image-taking range 52 is a range in which lights reflected on both edges of the original 3 reach the lens 11 when the original 3 is taken.

The image-taking angle 2θ is an angle formed when the image-taking range 52 is viewed from the camera 10. The reflected-image taking range 51 is an inside range that is expanded at an angle 2θ that is the same angle as the image-taking angle 2θ in a direction of leaving the optical axis 15 by taking both edges of the original 3 as basic points with respect to a direction of light directed to the lens 11 by being reflected on edges of the image-taking range 52, that is, on both edges of the original 3.

When the original 3 is taken by the camera 10 from right above, an image reflected on the camera 10 is also taken in with the original 3, when the original 3 has gloss, because the camera 10 is positioned within the reflected-image taking range 51. When an object other than the camera 10 such as a supporting member (not shown) that supports the camera 10 or the light source 55 is within the reflected-image taking range 51, an image reflected on the object other than the camera 10 is also taken in when the original 3 is imaged.

Figure 3:
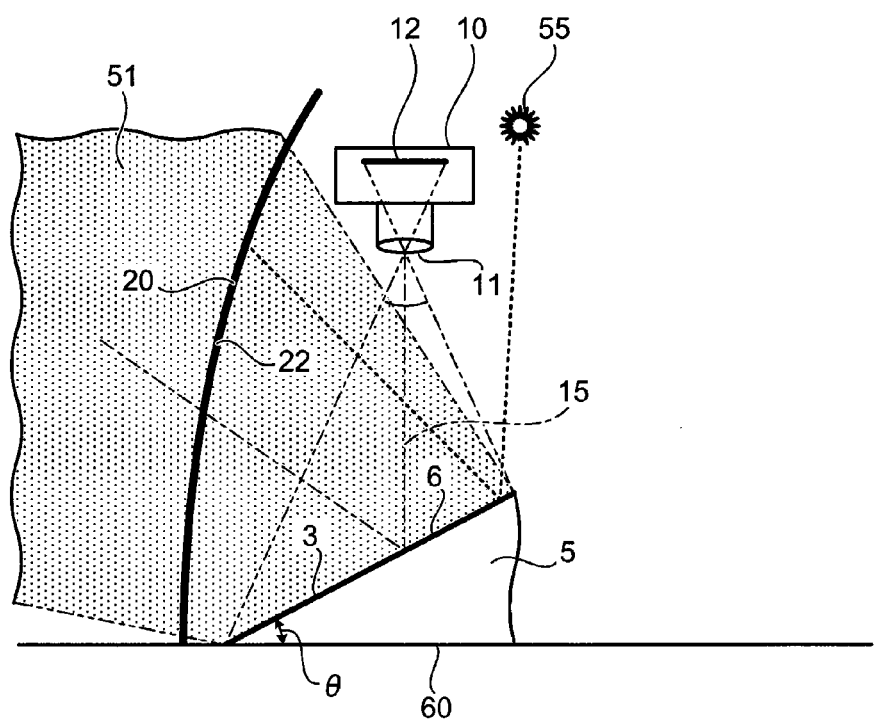
FIG. 3 is a schematic diagram for explaining a relation between a camera in the image reading apparatus according to the embodiment and a reflected-image taking range.

FIG. 3 is a schematic diagram for explaining a relation between the camera in the image reading apparatus shown in FIG. 1 and the reflected-image taking range. When the original 3 is taken by the camera 10, the optical axis 15 of the camera 10 is typically perpendicular to the original 3. However, the mounting surface 6 of the original glass 5 is inclined to the optical axis 15 in the image reading apparatus 1 of the embodiment. Therefore, when the original 3 is placed on the mounting surface 6, the original 3 is placed in such a manner as to be inclined to the optical axis 15.

The inclined angle θ is provided for the camera 10 to be positioned outside the reflected-image taking range 51 when the surface of the original 3 has gloss. In other words, when the original 3 is taken by the camera 10, the original glass 5 is arranged to incline the original 3 to the optical axis 15 until the camera 10 is positioned outside the reflected-image taking range 51 and to place the original 3.

An angle at which the original 3 is inclined to the optical axis 15 on the original glass 5, that is, an angle at which the mounting surface 6 is inclined is equal to or more than the angle θ that is a half of the image-taking angle 2θ with respect to a horizontal surface 60 with which the optical axis 15 perpendicularly intersects. Thus, the camera 10 is positioned outside the reflected-image taking range 51 of the original 3. The original glass bottom 8 (see FIG. 1) of the image reading apparatus 1 is formed in parallel with the horizontal surface 60. The original glass 5 is arranged to be capable of placing the original 3 thereon while the original 3 is inclined to the optical axis 15 whereby the original 3 can be taken by the camera 10.

The original glass 5 and the camera 10 are connected via the imaging case 20. At least part of the imaging case 20 is included within the reflected-image taking range 51. The imaging case 20 is arranged as a diffusing member made of a high light-diffusing material. A surface of the original glass 5 that faces the mounting surface 6 or an inner surface 22 that is inside the imaging case 20 is subjected to diffusing processing.

Figure 4:
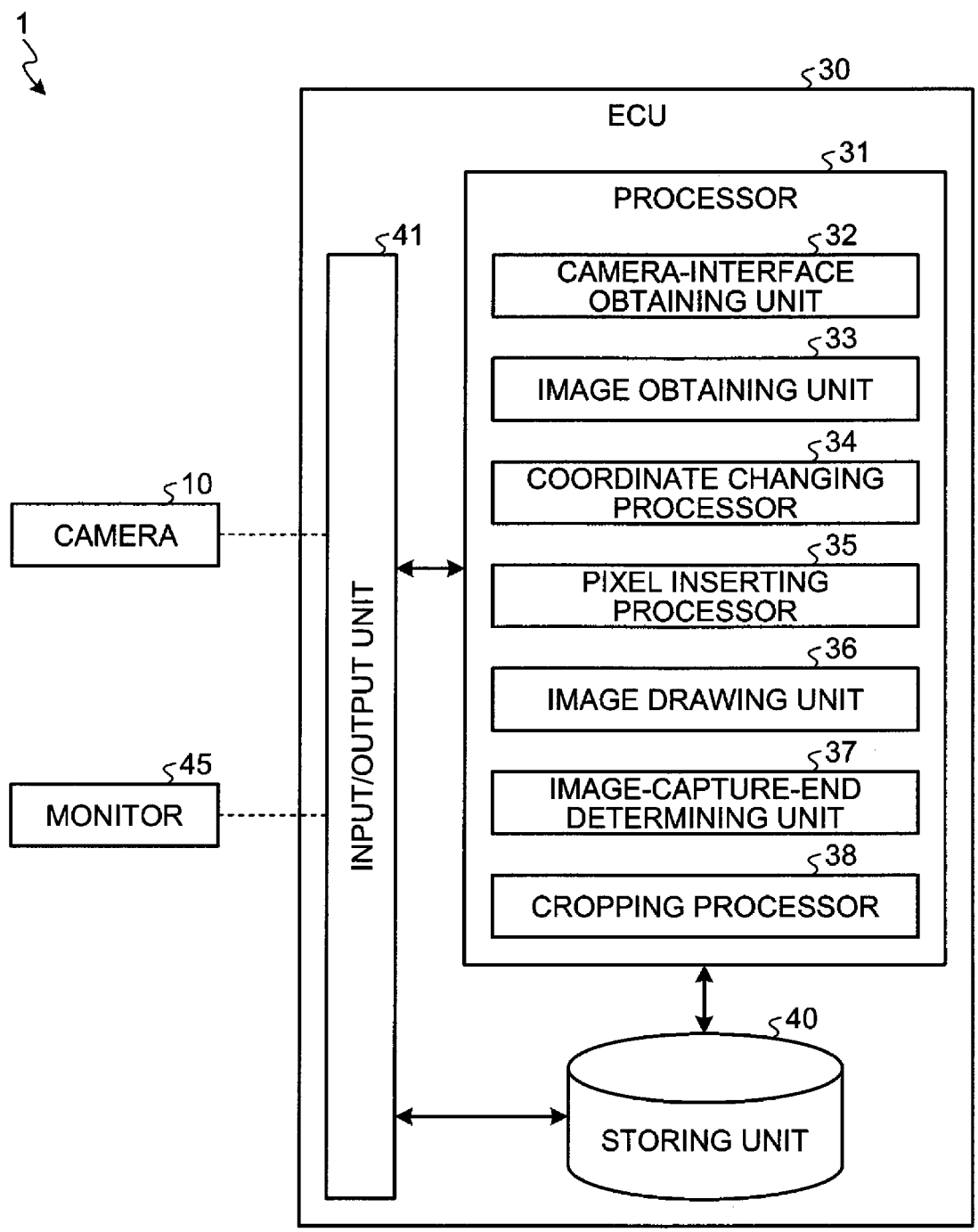
FIG. 4 is a schematic block diagram of a relevant part of the image reading apparatus according to the embodiment.

FIG. 4 is a schematic block diagram of a relevant part of the image reading apparatus 1 shown in FIG. 1. A personal computer (PC) (not shown) that performs processing to an image taken by the camera 10 is arranged in the image reading apparatus 1. The camera 10 is connected to the PC and thereby connected to an electric control unit (ECU) 30 in the PC. The PC includes a monitor 45 that displays an image as an image displaying unit and the monitor 45 is also connected to the ECU 30 as well as the camera 10.

The ECU 30 includes a processor 31, a storing unit 40, and an input/output unit 41 that are connected to one another and in which signals can be received or sent one another. The camera 10 and the monitor 45 that are connected to the ECU 30 are connected to the input/output unit 41 through which signals are received and sent between the camera 10 and the monitor 45. A computer program for correcting an image taken by the camera 10 is stored in the storing unit 40. The storing unit 40 includes a hard disk device, an optical magnetic disk device, a nonvolatile memory (a recording medium that can be only read such as a CD-ROM) such as a flash memory, a volatile memory such as a random access memory (RAM), or a combination thereof.

The processor 31 that is constituted of a memory and a central processing unit (CPU) includes at least a camera-interface obtaining unit 32 that obtains image information taken by the camera 10, an image obtaining unit 33 that obtains image information of the original 3 from the image information obtained by the camera-interface obtaining unit 32, a coordinate changing processor 34 by which coordinate axes are set in the image information obtained by the image obtaining unit 33 and that performs coordinate changing processing, a pixel inserting processor 35 that performs pixel inserting processing based on the result of the coordinate changing processing in the coordinate changing processor 34, an image drawing unit 36 that performs image drawing base on the result of the pixel inserting processing in the pixel inserting processor 35, an image-capture-end determining unit 37 that determines whether capturing an image obtained by the camera-interface obtaining unit 32 ends, and a cropping processor 38 that performs cropping to an image.

When an image taken by the camera 10 is corrected by the ECU 30, the processor 31 stores the computer program in a memory incorporated in the processor 31 and performs correction to the image by calculation. Then, the processor 31 appropriately stores numerical values on the way to the calculation in the storing unit 40 and performs calculation by using the stored numerical values. When the image taken by the camera 10 is corrected as described above, control can be performed by dedicated hardware different from the ECU 30 instead of the computer program.

The image reading apparatus 1 according to the embodiment is configured as described above and an operation thereof will be explained. The image reading apparatus 1 is used in a space in which a light source (not shown) is positioned outside the image reading apparatus 1 such as a fluorescent lamp arranged in a room. The imaging case 20 is formed of a translucent member. Therefore, light from outside of the image reading apparatus 1 such as a fluorescent lamp is emitted to the image reading apparatus 1. The light from outside of the image reading apparatus 1 is transmitted through the imaging case 20 and emitted to the mounting surface 6 of the original glass 5.

In addition, when the original 3 such as various cards is imaged by the image reading apparatus 1, the original 3 is placed on the mounting surface 6 through the opened portion 21 of the imaging case 20. Then, part of the mounting surface 6 on a side of the opened portion 21 is positioned high and the other part thereof is inclined low toward the back. Therefore, the original 3 is moved from the opened portion 21 to the back in a sliding manner. However, the step portion 7 is formed on the mounting surface 6. The step portion 7 is arranged on the part of the mounting surface 6 that approaches to a side of the original glass bottom 8, that is, on the part of the mounting surface 6 that is positioned to the back when viewed from the opened portion 21 and is formed to face the opened portion 21, that is, in a direction in which the inclination is increased. Thus, when the original 3 is placed on the mounting surface 6 from the opened portion 21, the original 3 stops moving to the back, when viewed from the opened portion 21, by bringing the original 3 into contact with the step portion 7.

Thus, the original 3 placed on the mounting surface 6 is irradiated with light from outside that is transmitted through the imaging case 20. The inner surface 22 of the imaging case 20 is subjected to diffusing processing and serves as a diffusing member that has high light diffusing properties. Therefore, light from outside is transmitted through the imaging case 20 while diffused. The transmitted light travels inside the imaging case 20 and most of the light reaches the original 3 placed on the mounting surface 6. Then, the light is reflected on a surface of the original 3 and part of the reflected light reaches the camera 10. The reflected light that reaches the camera 10 enters inside the camera 10 through the lens 11 and reaches the image pickup device 12. Thus, an image of the original 3 can be taken by the camera 10.

As described above, an image taken by the camera 10 is processed to be corrected by the ECU 30. In other words, the original 3 is inclined until the camera 10 is positioned outside the reflected-image taking range 51. The image of the original 3 taken by the camera 10 is corrected by the ECU to be in a state in which the original 3 is taken by the camera 10 while the optical axis 15 is perpendicular to the original 3. Specifically, the coordinate changing processor 34 and the pixel inserting processor 35 of the processor 31 perform well-known projective transformation processing to correct the image of the original 3 taken by the camera 10. Therefore, the coordinate changing processor 34 and the pixel inserting processor 35 are arranged as an image correcting unit to correct an image taken by the camera 10.

Figure 5A:
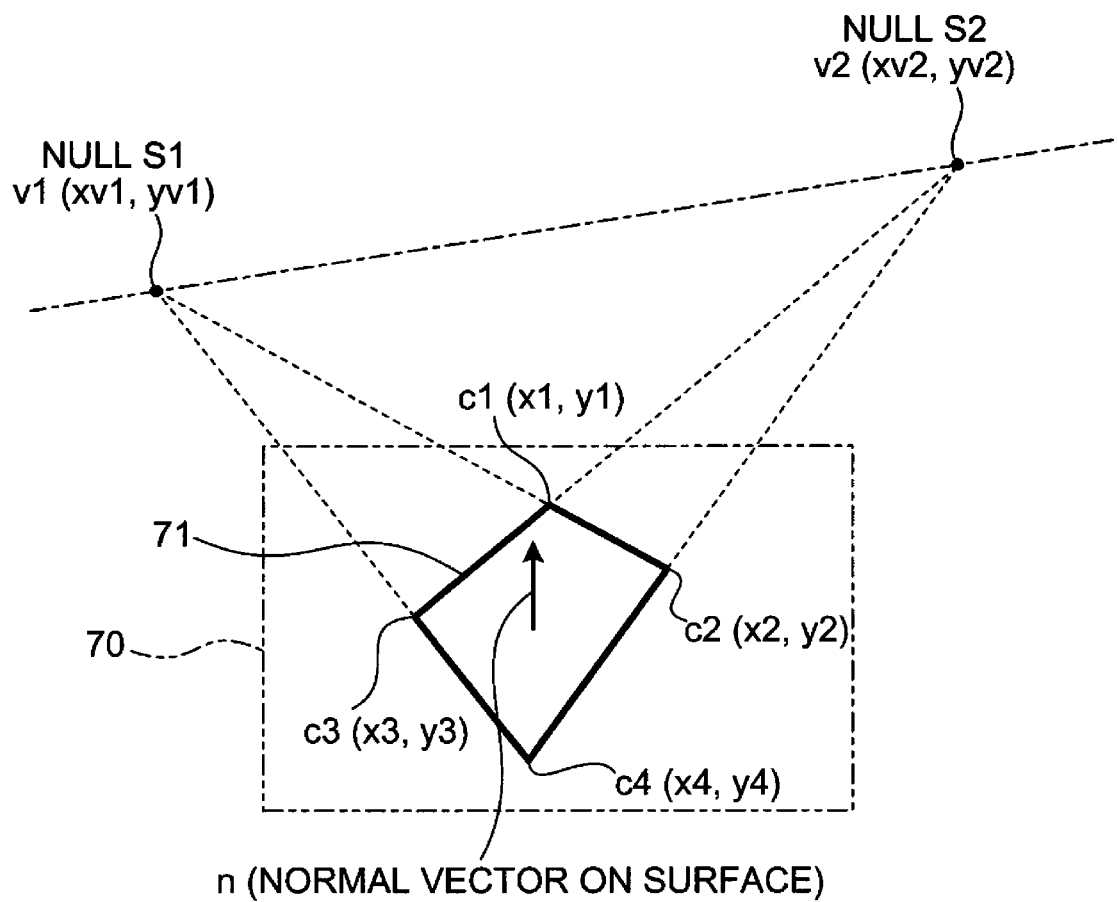
FIGS. 5A and 5B are schematic diagrams for explaining projective transformation.

Projective transformation is explained with reference to FIGS. 5A and 5B. Projective transformation performed by the coordinate changing processor 34 and the pixel inserting processor 35 is to restore an image taken by the camera 10 to its original state by using inverse transformation of projection. When projective transformation is performed, nulls formed by an image on an imaged surface 70 that is a surface of an image taken by the camera 10 are found. For example, when an imaging-surface shape 71 that is a shape of the image on the imaged surface 70 is rectangular as shown in FIG. 5A, nulls are two of S1 and S2. The null means a vanishing point in the distance at which two straight lines actually formed in parallel are extended and finally intersected with each other when a predetermined shape is projected.

Projective transformation is performed based on the following Equation (1) by finding nulls as described above and then finding a size of an original shape before projected based on the nulls and a projective transformation parameter that is a parameter when projective transformation is performed. In other words, projective transformation is performed by finding coordinates (u, V, 1) after projective transformation based on coordinates (x, y, 1) before projective transformation through calculation of Equation (1).

$$\begin{pmatrix} u \\ v \\ 1 \end{pmatrix} = \frac{1}{a31x + a32y + 1} \begin{pmatrix} a11 & a12 & a13 \\ a21 & a22 & a23 \\ a31 & a32 & 1 \end{pmatrix} \begin{pmatrix} x \\ y \\ 1 \end{pmatrix} \quad (1)$$

Figure 5B:
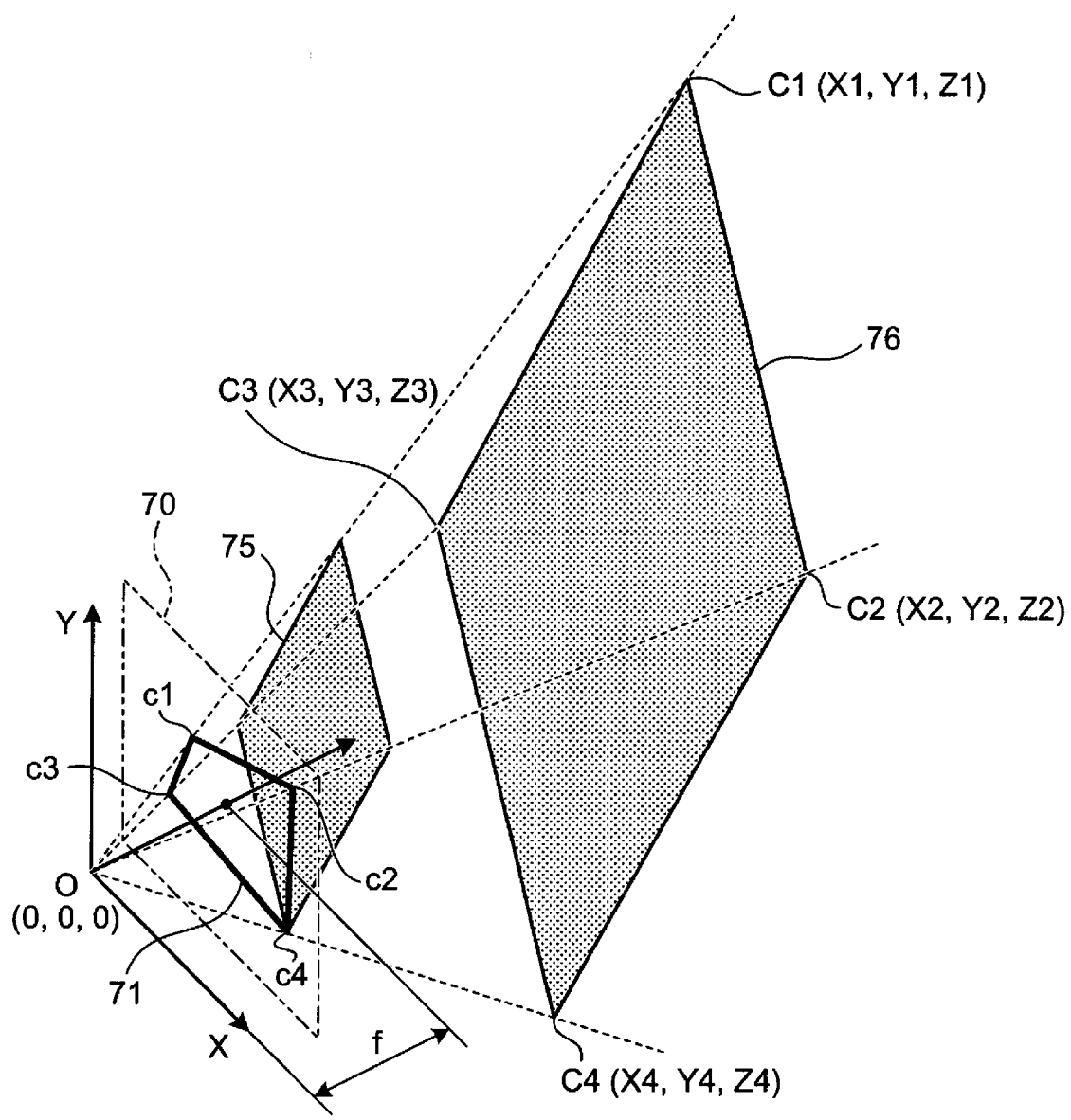

Thus, it is possible to obtain an after-projective-transformation shape 75 that is a shape of an image to which projective transformation is performed as shown in FIG. 5B by performing projective transformation with respect to coordinates of the imaging-surface shape 71 that are coordinates before projective transformation and finding coordinates after projective transformation. The after-projective-transformation shape 75 is analogous to a shape of an object that is taken by the camera 10 and that is viewed from the front, that is, an object shape 76 when an imaged surface is viewed in a perpendicular direction. Such coordinate transforming processing is performed by the coordinate changing processor 34.

After coordinates are transformed, the pixel inserting processor 35 performs inserting processing with respect to pixels that form an image based on the coordinates that are subjected to transformation processing. Thus, a shape of an image after projective transformation can be found based on the coordinates after projective transformation is performed by the coordinate changing processor 34. Then, an image is drawn by the image drawing unit 36 and is output to and displayed on the monitor 45.

Figure 7A:
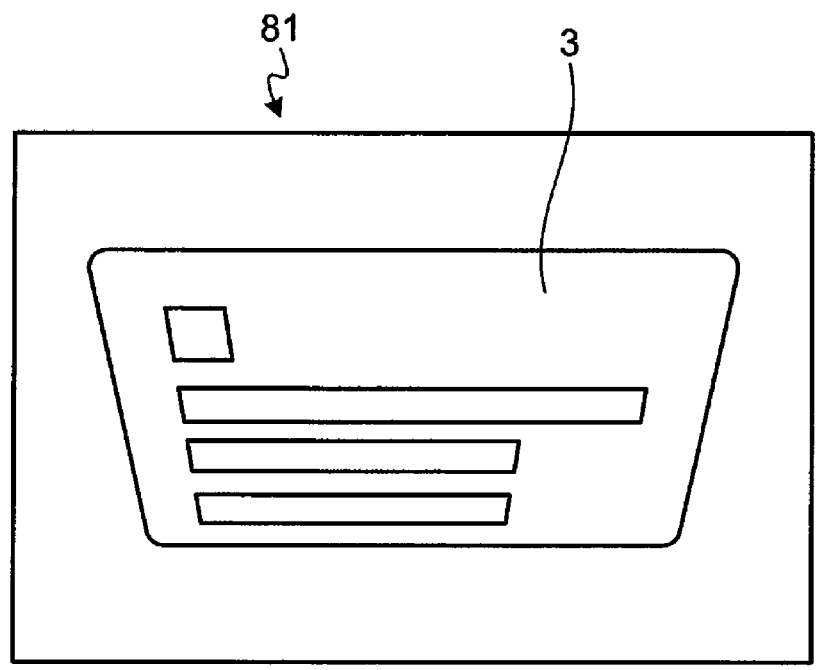
FIG. 7A is a schematic diagram of an image taken by a camera before projective transformation processing.
Figure 7B:
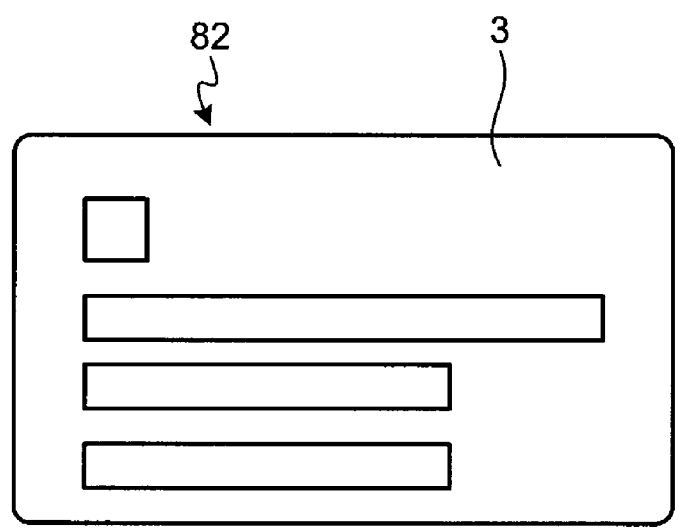
FIG. 7B is a schematic diagram of an image taken by the camera after projective transformation processing.

FIG. 6 is a flowchart of a processing procedure performed by the image reading apparatus 1. FIG. 7A is a schematic diagram of an image taken by the camera 10 before projective transformation. FIG. 7B is a schematic diagram of an image taken by the camera 10 after projective transformation. Next, a method of imaging an original 3 by the image reading apparatus 1, that is, a processing procedure in which an original 3 is imaged and corrected by the image reading apparatus 1 is explained. First, a camera interface of the camera 10 is obtained (at Step ST101). An image taken by the camera 10 is obtained by the image obtaining unit 33.

An image is obtained (at Step ST102). When an original 3 is taken by the camera 10 and an image taken by the camera 10 is obtained, image information sent by the camera 10 is obtained by the image obtaining unit 33. The image of the original 3 taken by the camera 10 is inclined with respect to the optical axis 15 because the mounting surface 6 is inclined with respect to the optical axis 15. Therefore, even if the original 3 is substantially rectangular, the shape of the original 3 taken by the camera 10 is changed into a shape other than a rectangle, for example substantially a trapezoidal shape. In this case, the image of the original 3 in an obtained image 81 that is an image obtained by the image obtaining unit 33 is also substantially a trapezoidal shape shown in FIG. 7A.

The coordinate changing processing is performed (at Step ST103) by the coordinate changing processor 34 with respect to the image obtained by the image obtaining unit 33. In that case, nulls formed by the image on the imaged surface 70 are found based on the image obtained by the image obtaining unit 33. A projective transformation parameter is found based on the nulls, and coordinates (u, V, 1) after projective transformation are found based on coordinates (x, y, 1) before projective transformation through calculation of Equation (1). Thus, coordinate changing processing is performed based on projective transformation.

Pixel inserting processing is performed (at Step ST104) by the pixel inserting processor 35 based on the coordinates to which coordinate changing processing is performed by the coordinate changing processor 34. The pixel inserting processing is performed by a well-known bilinear method (bi-linear interpolation) or bicubic method (bi-cubic convolution). Thus, the pixel inserting processing is performed to obtain a shape of an image after projective transformation based on coordinates to which projective transformation is performed by the coordinate changing processor 34.

Image drawing is performed (at Step ST105) by the image drawing unit 36. The shape of the image after projective transformation that is obtained by performing pixel inserting processing by the pixel inserting processor is output to the monitor 45, so that the shape of the image obtained by the pixel inserting processor 35 is drawn and displayed as an actual image by the image drawing unit 36. Thus, the image displayed on the monitor 45 is an image after projective transformation. Therefore, the original 3 is not inclined with respect to the optical axis 15 and is displayed in such a manner that the original 3 is viewed in a direction in which the optical axis 15 is perpendicularly intersected with the original 3. For this reason, when a shape of the original 3 is substantially rectangular, a displayed image 82 displayed on the monitor that is a shape of the original 3 is substantially rectangular shown in FIG. 7B.

It is determined whether image capturing has finished by the image-capture-end determining unit 37 (at Step ST106). The image-capture-end determining unit 37 determines whether an image obtained by the pixel inserting processor 35 is captured. When it is determined that image capturing has not finished based on a determination of the image-capture-end determining unit 37, a system control returns to the step (Step ST102) at which an image is obtained and the rest image processing is performed from the step of ST102.

However, when it is determined that image capturing has finished based on a determination of the image-capture-end determining unit 37, cropping is performed (at Step ST107). The cropping means to obtain only image information of the original 3 by the cropping processor 38 based on the image information obtained by the pixel inserting processor 35. In other words, cropping is performed by the cropping processor 38, so that image information of the original 3 is cut out. Thus, the image information of the original 3 obtained through cropping of the cropping processor 38 is stored in the storing unit 40 of the ECU 30. After the cropping is performed by the cropping processor 38, the processing procedure ends.

The original 3 is inclined with respect to the optical axis 15 in the image reading apparatus 1 until the camera 10 is positioned outside the reflected-image taking range 51. This makes it possible, when the original 3 is taken by the camera 10, to prevent the camera 10 from being reflected on the original 3 and being taken in with the original 3. The imaging case 20 formed of a diffusing member that is made of a high light-diffusing material is arranged in the reflected-image taking range 51. This makes it possible to prevent an object positioned in the reflected-image taking range 51 from being reflected on the original 3 and taken by the camera 10. Consequently, clear image information can be obtained more reliably.

The image of the original 3 taken by the camera 10 while the original 3 is inclined is corrected by the coordinate changing processor 34 and the pixel inserting processor 35 to be in a state in which the original 3 is imaged while the optical axis 15 of the camera 10 is perpendicular to the original 3. Therefore, if the image of the original 3 is taken by the camera 10 while the original 3 is inclined to prevent the camera 10 from being taken in the image, it is possible to enhance visibility of the taken image because the taken image is in the same state as in which the original 3 is viewed from the front. Consequently, clear image information can be obtained more reliably.

The inner surface 22 of the imaging case 20 is subjected to diffusing processing, so that the imaging case 20 can be reliably prevented from being taken in with the original 3. The imaging case 20 is made of a translucent member. Therefore, when the original 3 is imaged, it is possible to capture the image of the original 3 by using light from a light source outside the image reading apparatus 1. Thus, it is unnecessary to provide a light source such as a lighting unit in the image reading apparatus 1, thereby leading to its simple configuration. Consequently, clear image information can be easily obtained more reliably.

The original glass 5 and the camera 10 are connected to each other by the imaging case 20, which serves as a framework. Hence, it is unnecessary to separately provide a member for connecting the original glass 5 and the camera 10 and a diffusing member for diffusing light from outside and transmitting the light, thereby leading to a lower component count. This makes it possible to more reliably provide a simple configuration and to reduce manufacturing costs.

Projective transformation is performed by the ECU 30 that PC has in the image reading apparatus 1. However, projective transformation can be performed by the camera 10 by arranging a unit that enables projective transformation to the camera 10, for example arranging the ECU 30 to the camera 10. If processing is performed in real time, whether projective transformation is performed by the PC or performed by the camera 10, it is possible to check the original 3 on the monitor 45 as if the original 3 is taken from the front without noticing that the original 3 is inclined and imaged. In addition, projective transformation of an image does not need to be performed in real time. Even when projective transformation is performed after an image is taken, it is possible to check the image on the monitor 45 as if the original 3 is taken from the front. In other words, when an image taken by the camera 10 is displayed on the monitor 45, an image after projective transformation is performed can be displayed. This makes it possible to prevent the camera 10 from being taken in and provide an image that has a high level of visibility.

When an image taken in taking the original 3 while the original 3 is inclined with respect to the optical axis 15 is corrected to be in a state in which the original 3 is taken by the camera 10 for the optical axis 15 to be perpendicular to the original 3, correction can be performed by a method other than projective transformation. Irrespective of a correcting unit or correcting method, an image taken while the original 3 is inclined with respect to the optical axis 15 is corrected. Therefore, even when the original 3 is inclined to prevent the camera 10 from being taken in, it is possible to provide an image that has a high level of visibility.

Figure 8:
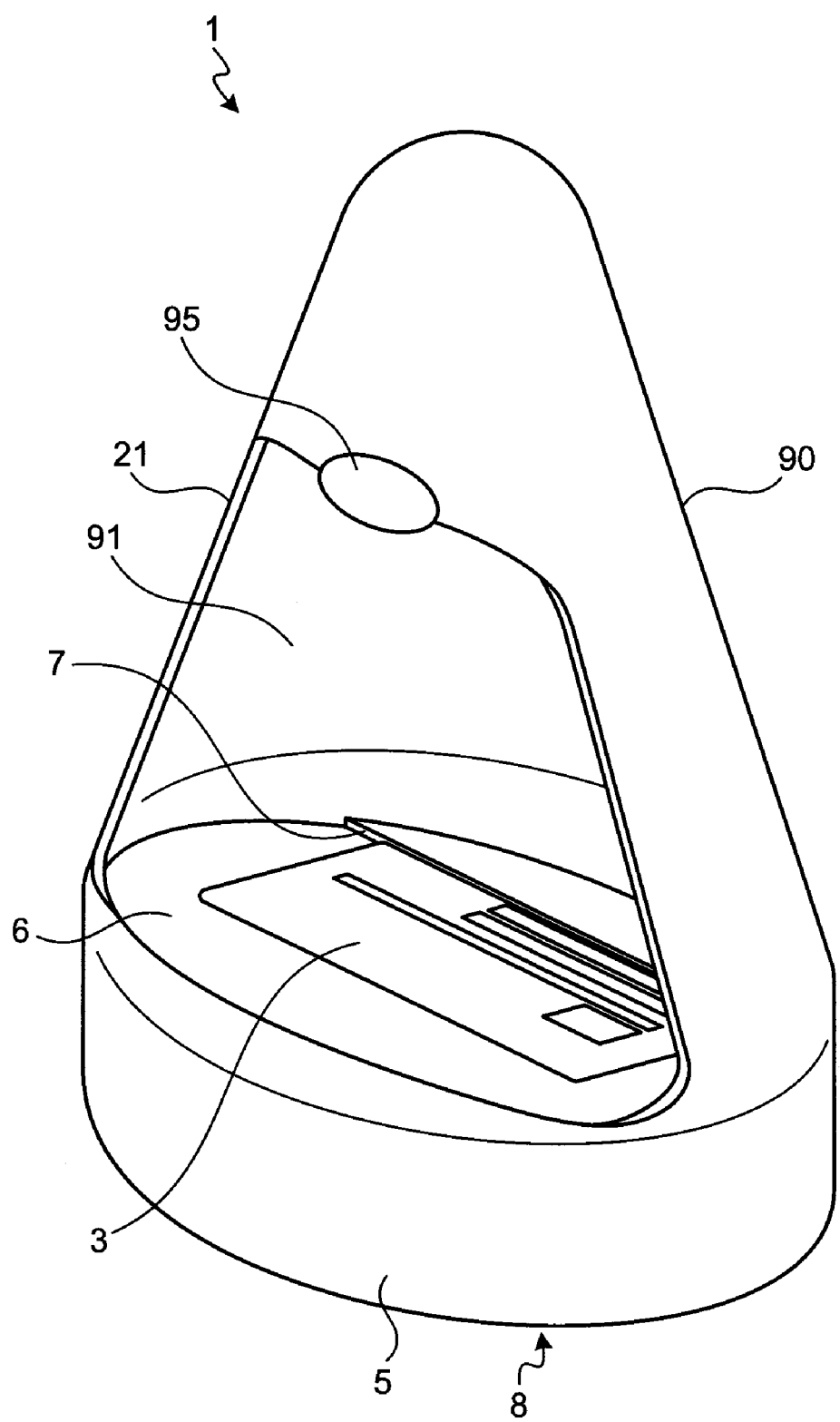
FIG. 8 is a perspective view of an image reading apparatus according to a modified example of the present invention.

FIG. 8 is a perspective view of the image reading apparatus according to a modified example of the present invention. The imaging case 20 of the image reading apparatus 1 is made of a translucent member and light used when an original is taken is sent from a light source outside the image reading apparatus 1. However, the image reading apparatus can include a lighting unit to emit light when an original is taken. As shown in FIG. 8, for example, the image reading apparatus 1 can include a panel light 95 that is a lighting unit as a light source near the camera 10 (see FIG. 1). The panel light 95 is positioned outside the reflected-image taking range 51 (see FIG. 3) to irradiate the original 3. When the panel light 95 is provided, an imaging case 90 does not need to be translucent. It is preferable that an inner surface 91 of the imaging case 90, that is, a surface that faces the mounting surface 6 is black and additionally preferable to be black in a state of high light-diffusing properties. As a method of increasing light-diffusing properties, diffusing processing can be performed to the inner surface 91 of the imaging case 90 or lackluster black such as mat finish can be used when the inner surface 91 of the imaging case 90 is colored black. When black mat finish is applied to the inner surface 91 of the imaging case 90, the inner surface 91 has higher light absorbing properties.

The panel light 95 is arranged outside the reflected-image taking range 51. Therefore, while light is emitted to the original 3 and the original 3 is clearly imaged, the panel light 95 can be prevented from being taken in when the original 3 is taken. In that case, as the panel light 95 is indicated as the light source 55 in FIG. 3, when light from the panel light 95 is reflected on the original 3, the reflected light is not directed to the camera 10. This makes it possible to prevent the panel light 95 from being taken in when the original 3 is taken. Consequently, clear image information can be more reliably obtained.

The inner surface 91 of the imaging case 90 is colored black, so that the inner surface 91 has higher light absorbing properties. This makes it possible to prevent light from the panel light 95 from being reflected on the inner surface 91. When the original 3 is taken by the camera 10, it is possible to prevent light reflected on the inner surface 91 from being reflected on the original 3 and a reflected image from being taken in. Consequently, clear image information can be more reliably obtained.

In other words, the imaging case 20, 90 can be made of a high light-diffusing material or a high light-absorbing material. The imaging case 20, 90 can be made of a material that has a property of at least either a high light-diffusing material or a high light-absorbing material. These materials have less mirror reflection of light, that is, less specular reflection of light. Therefore, the imaging case 20, 90 is made of the materials that have such a property, so that it is possible to reduce or diffuse light that is reflected on the inner surface 22, 91 of the imaging case 20, 90 and reaches the original 3. This makes it possible to prevent a shape of the imaging case 20, 90 that is positioned in the reflected-image taking range 51 from being reflected on the original 3 and taken by the camera 10. Consequently, clear image information can be more reliably obtained.

According to embodiments of the present invention, an object is inclined with respect to an optical axis of an imaging unit to a position at which the imaging unit is positioned outside a reflected-image taking range. Therefore, when the object is imaged by the imaging unit, it is possible to prevent the imaging unit from being reflected on the object and being taken in. In addition, a diffusing member made of a high light-diffusing material or a high light-absorbing material is arranged in the reflected-image taking range. This makes it possible to prevent an object positioned in the reflected-image taking range from being reflected on the object and being taken in by the imaging unit. As a result, clear image information can be more reliably obtained.

Furthermore, an image of the inclined object that is imaged by the imaging unit is corrected by an image correcting unit to be in a state in which it is assumed that the object is imaged for an optical axis of the imaging unit to be perpendicular to the object. This makes it possible, even when the object is inclined and imaged lest the imaging unit is taken in, to enhance visibility of the taken image because the taken image is the same as an image when the object is viewed from the front. As a result, clear image information can be more reliably obtained.

Moreover, it is possible to more reliably prevent an object from being taken in with an object because a surface of the diffusing member that faces a mounting unit is subjected to diffusing processing. When an object is imaged, it is possible to take the object by using light from a light source outside an image reading apparatus because the diffusing member is made of a translucent member. Therefore, it is unnecessary to provide a light source such as a lighting device to the image reading apparatus, thereby leading to its simple configuration. Consequently, clear image information can be more reliably and easily obtained.

Furthermore, a lighting unit is provided outside the reflected-image taking range. Therefore, it is possible to prevent the lighting unit from being taken in with the object, when the object is imaged, while light is emitted to the object and the object is clearly taken. As a result, clear image information can be more reliably obtained.

Clear image information can be more reliably and effectively obtained in an image reading apparatus according to an aspect of the present invention.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
   an imaging unit that images an object;
   a mounting unit on which, when the imaging unit is capable of imaging the object and the object is imaged by the imaging unit, the object is inclined with respect to an optical axis of the imaging unit at least until the imaging unit is positioned outside a reflected-image taking range in which an image of the imaging unit that is reflected on the object is taken in, and placed; and
   a diffusing member that is made of one of a high light-diffusing material and a high light-absorbing material and that is arranged in the reflected-image taking range.

2. The image reading apparatus according to claim 1, further comprising an image correcting unit by which an image of the object taken by the imaging unit while the object is inclined until the imaging unit is positioned outside the reflected-image taking range is corrected to be in a state in which the object is taken by the imaging unit for the optical axis of the imaging unit to be perpendicular to the object.

3. The image reading apparatus according to claim 1, wherein the diffusing member includes a translucent member and a surface of the diffusing member that faces the mounting unit is subjected to diffusing processing.

4. The image reading apparatus according to claim 1, further comprising a lighting unit that is positioned outside the reflected-image taking range and that emits light to the object.

* * * * *